July 14, 1942.　　　H. R. FORD　　　2,289,767
FISHHOOK EXTRACTOR
Filed April 24, 1941
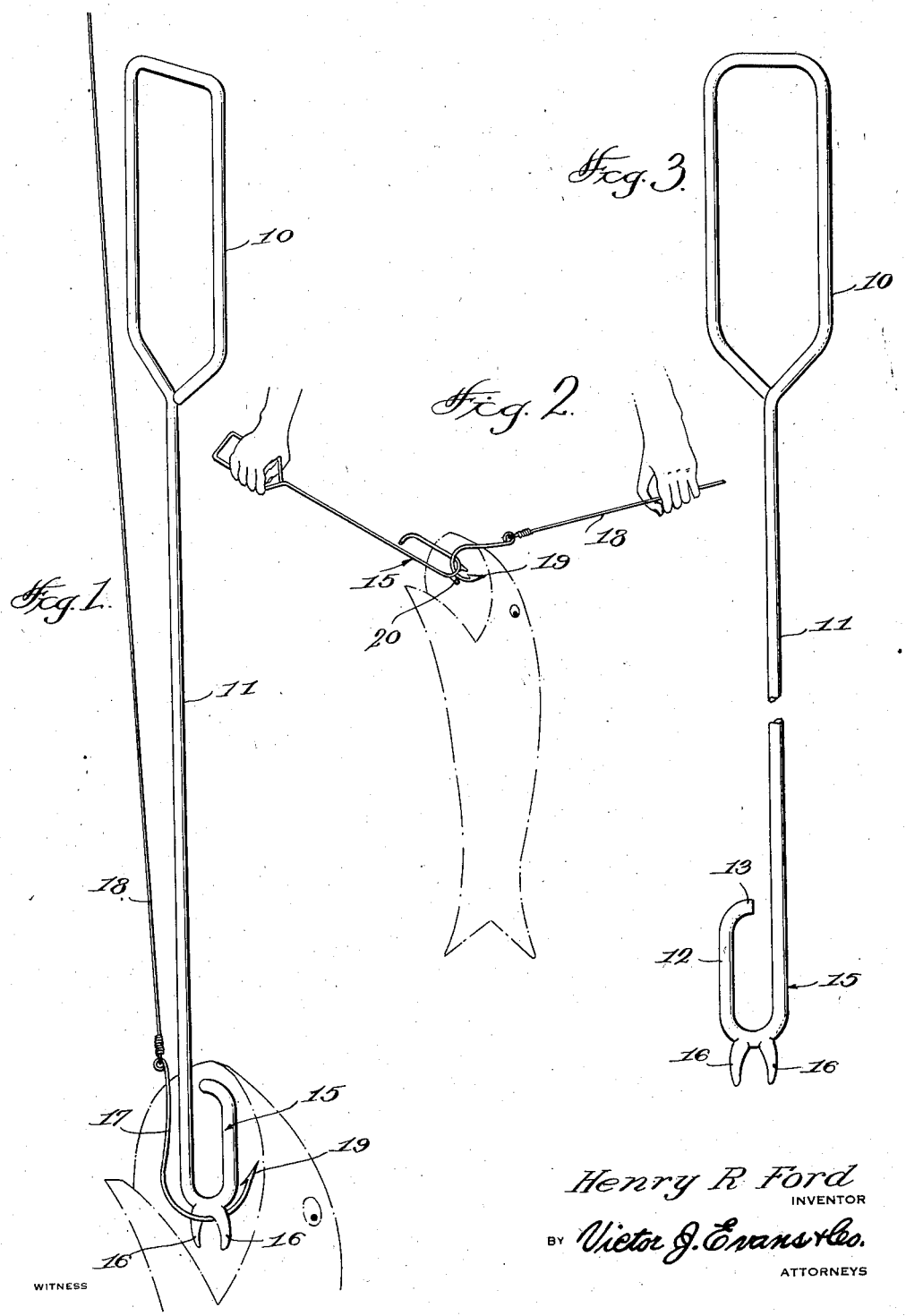
Henry R. Ford
INVENTOR
BY Victor J. Evans & Co.
ATTORNEYS Patented July 14, 1942

2,289,767

UNITED STATES PATENT OFFICE 2,289,767

FISHHOOK EXTRACTOR

Henry R. Ford, South Jacksonville, Fla.

Application April 24, 1941, Serial No. 390,179

1 Claim. (Cl. 43—29)

This invention relates to a fish hook extractor and has for an object to provide a device which will facilitate the easy removal of a hook that has been swallowed and that is far down in the fish's throat.

A further object is to provide a device of this character which will facilitate the removal of a fish hook without the use of the hands touching undesirable fish, such as cat fish, toad fish, eels and the like, the slime of which is very injurious to fishermen's eyes when the eyes are rubbed after handling such undesirable fish.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a perspective view of a fish hook extractor constructed in accordance with the invention, showing the device applied to remove a deeply swallowed fish hook.

Figure 2 is a perspective view of the device applied to remove the fish hook from an undesirable fish without handling the fish.

Figure 3 is a side elevation of the fish hook extractor.

Referring now to the drawing in which like characters of reference designate similar parts in the various views, the fish hook extractor is formed from a single length of steel wire formed into an elongated loop handle 10 at one of its ends and including a straight shank portion 11, the forward end of the shank portion being bent back upon itself, as shown at 12, and terminally bent inwardly at a right angle toward the shank portion, and terminating short of the shank portion, as shown at 13, to form an open loop 15. On the forward end of the loop, that is, at the bight thereof, a pair of curved prongs 16 are mounted by welding or other means to provide an extracting fork, the use of which is best illustrated in Figure 1. When a fish hook 17 has been swallowed deeply by the fish, the prongs 16 are placed astride of the fish line 18 and then slid into the mouth of the fish until the prongs straddle the curved portion of the fish hook back of the barb 19. Further pressure of the device against the fish hook, while the fish line is held taut, will effectively dislodge the fish hook.

Another use of the device is shown in Figure 2 for extracting a fish hook from objectionable fish which are to be returned to the water without handling. In this use of the device, the fish line 18 is grasped in the left hand and held taut and then the open loop is slipped down upon the fish line until the fish hook is received in the bight 20 of the open loop 15 in rear of the barb 19. With the hands of the operator spread apart, the fish is rotated on the line and on the device as an axis of rotation toward the fisherman and then swung up and forwardly over the fish line with a flipping action which dislodges the hook from the fish and throws the fish away from the fisherman.

From the above description it is thought that the construction and operation of the invention will be fully understood without further explanation.

What is claimed is:

A fish hook extractor comprising an elongated loop handle, a straight shank extending from the handle, the forward end of the shank being bent back upon itself then terminally bent inwardly at a right angle toward the shank and terminating short of the shank to form an open loop on the end of the shank adapted to receive a fish line and guide the loop into engagement with a fish hook back of the barb of the hook, said open loop being provided at the forward end with a pair of diverging prongs adapted to straddle a fish hook and dislodge the fish hook when rectilinear pressure is applied to the handle, said open loop being adapted to form part of an axis of rotation of which the fish line is the other part whereby a fish with the hook impaled therein may be rotated toward the fisherman and then swung over the axis of rotation to dislodge the hook.

HENRY R. FORD.